(12) United States Patent
Iga (10) Patent No.: US 6,249,545 B1
(45) Date of Patent: Jun. 19, 2001

(54) VIDEO COMPRESSION DECOMPRESSION AND TRANSMISSION

(76) Inventor: Adam S. Iga, P.O. Box 2917, Kampala (UG)

(*) Notice: Subject to any disclaimer, the term of this patent is extended or adjusted under 35 U.S.C. 154(b) by 0 days.

(21) Appl. No.: 09/172,022

(22) Filed: Oct. 14, 1998

Related U.S. Application Data (60) Provisional application No. 60/061,951, filed on Oct. 14, 1997.

(51) Int. Cl.$^7$ .............................. H04B 1/66; G06K 9/00; H04N 7/12
(52) U.S. Cl. ...................................... 375/240.01; 382/166
(58) Field of Search ............................... 375/240, 240.01; 348/342; 382/162, 164, 166, 167, 236, 238, 266; H04B 1/66; H04N 7/12; G06K 9/00

(56) References Cited

U.S. PATENT DOCUMENTS

| | | | |
|---|---|---|---|
| 5,319,395 | * 6/1994 | Larky et al. ...................... | 345/190 |
| 5,777,608 | * 7/1998 | Lipovski et al. .................. | 345/189 |
| 5,909,505 | * 7/1999 | Katayama et al. ................ | 382/164 |
| 5,917,656 | * 6/1999 | Okasawa et al. ................. | 382/266 |
| 6,044,172 | * 3/2000 | Allen ................................. | 382/166 |
| 6,061,782 | * 5/2000 | Elliott et al. ...................... | 712/222 |
| 6,141,441 | * 10/2000 | Cass et al. ........................ | 382/166 |

\* cited by examiner

*Primary Examiner*—Chris Kelley
*Assistant Examiner*—Tung Vo
(74) *Attorney, Agent, or Firm*—Laurence J. Marhoefer; Venable (57) ABSTRACT

A computer method for compressing, then decompressing an image frame of a specified size, by multiplying the image frame size with a specified color depth coding to obtain an image frame binary code or word, then writing out a mathematical expression that completely describes said image frame binary word or code, whereby said mathematical expression has a one-to-one unique relationship with said image frame binary word or code.

8 Claims, 10 Drawing Sheets

| COLUMN A | COLUMN B |
|---|---|
| [[0↑0]+0] → | 00 00 |
| [[2↑0]+0] → | 00 01 |
| [[2↑1]+0] → | 00 10 |
| [[2↑1]+1] → | 00 11 |
| [[2↑2]+0] → | 01 00 |
| [[2↑2]+1] → | 01 01 |
| [[2↑2]+2] → | 01 10 |
| [[2↑2]+3] → | 01 11 |
| [[2↑3]+0] → | 10 00 |
| [[2↑3]+1] → | 10 01 |
| [[2↑3]+2] → | 10 10 |
| [[2↑3]+3] → | 10 11 |
| [[2↑3]+4] → | 11 00 |
| [[2↑3]+5] → | 11 01 |

| COLUMN A (CONT.) | COLUMN B (CONT.) |
|---|---|
| [[2↑3]+6] → | 11 10 |
| [[2↑3]+7] → | 11 11 |

| COLUMN A | COLUMN B | | COLUMN A (CONT.) | COLUMN B (CONT.) |
|---|---|---|---|---|
| [[0↑0]+0] → | 00 00 | | [[2↑3]+6] → | 11 10 |
| [[2↑0]+0] → | 00 01 | | [[2↑3]+7] → | 11 11 |
| [[2↑1]+0] → | 00 10 | | | |
| [[2↑1]+1] → | 00 11 | | | |
| [[2↑2]+0] → | 01 00 | | | |
| [[2↑2]+1] → | 01 01 | | | |
| [[2↑2]+2] → | 01 10 | | | |
| [[2↑2]+3] → | 01 11 | | | |
| [[2↑3]+0] → | 10 00 | | | |
| [[2↑3]+1] → | 10 01 | | | |
| [[2↑3]+2] → | 10 10 | | | |
| [[2↑3]+3] → | 10 11 | | | |
| [[2↑3]+4] → | 11 00 | | | |
| [[2↑3]+5] → | 11 01 | | | |

| COLUMN C | COLUMN D | | COLUMN E | COLUMN G |
|---|---|---|---|---|
| [[0↑0]+0] → | 000 000 | | [[2↑3]+6] → | 001 110 |
| [[2↑0]+0] → | 000 001 | | [[2↑3]+7] → | 001 111 |
| [[2↑1]+0] → | 000 010 | | [[2↑4]+0] → | 010 000 |
| [[2↑1]+1] → | 000 011 | | [[2↑4]+1] → | 010 001 |
| [[2↑2]+0] → | 000 100 | | [[2↑4]+2] → | 010 010 |
| [[2↑2]+1] → | 000 101 | | [[2↑4]+3] → | 010 011 |
| [[2↑2]+2] → | 000 110 | | [[2↑4]+4] → | 010 100 |
| [[2↑2]+3] → | 000 111 | | [[2↑4]+5] → | 010 101 |
| [[2↑3]+0] → | 001 000 | | [[2↑4]+6] → | 010 110 |
| [[2↑3]+1] → | 001 001 | | [[2↑4]+7] → | 010 111 |
| [[2↑3]+2] → | 001 010 | | [[2↑4]+8] → | 011 000 |
| [[2↑3]+3] → | 001 011 | | [[2↑4]+9] → | 011 001 |
| [[2↑3]+4] → | 001 100 | | [[2↑4]+10] → | 011 010 |
| [[2↑3]+5] → | 001 101 | | [[2↑4]+11] → | 011 011 |
| | | | [[2↑4]+12] → | 011 100 |

FIG. 7A

| COLUMN E (CONT.) | COLUMN G (CONT.) | COLUMN E (CONT.) | COLUMN G (CONT.) |
|---|---|---|---|
| [[2↑4]+13] → | 011 101 | [[2↑5]+11] → | 101 011 |
| [[2↑4]+14] → | 011 110 | [[2↑5]+12] → | 101 100 |
| [[2↑4]+15] → | 011 111 | [[2↑5]+13] → | 101 101 |
| [[2↑5]+0] → | 100 000 | [[2↑5]+14] → | 101 110 |
| [[2↑5]+1] → | 100 001 | [[2↑5]+15] → | 101 111 |
| [[2↑5]+2] → | 100 010 | [[2↑5]+16] → | 110 000 |
| [[2↑5]+3] → | 100 011 | [[2↑5]+17] → | 110 001 |
| [[2↑5]+4] → | 100 100 | [[2↑5]+18] → | 110 010 |
| [[2↑5]+5] → | 100 101 | [[2↑5]+19] → | 110 011 |
| [[2↑5]+6] → | 100 110 | [[2↑5]+20] → | 110 100 |
| [[2↑5]+7] → | 100 111 | [[2↑5]+21] → | 110 101 |
| [[2↑5]+8] → | 101 000 | [[2↑5]+22] → | 110 110 |
| [[2↑5]+9] → | 101 001 | [[2↑5]+23] → | 110 111 |
| [[2↑5]+10] → | 101 010 | [[2↑5]+24] → | 111 000 |

FIG. 7B

| COLUMN E (CONT.) | COLUMN G (CONT.) |
|---|---|
| [[2↑5]+25] → | 111 001 |
| [[2↑5]+26] → | 111 010 |
| [[2↑5]+27] → | 111 011 |
| [[2↑5]+28] → | 111 100 |
| [[2↑5]+29] → | 111 101 |
| [[2↑5]+30] → | 111 110 |
| [[2↑5]+31] → | 111 111 |

VIDEO COMPRESSION DECOMPRESSION AND TRANSMISSION

This application claims benefit of provisional application 60/061,951, filed Oct. 14, 1997.

BACKGROUND OF THE INVENTION

1. Field of the Invention

The present invention relates generally to video image compression and specifically to a method of compressing and then decompressing either "still" or "moving" video images so that for full-motion, (30 frames per second) and full screen "moving" video transmission on at least a standard 640×480 resolution computer display screen in at least 24-bit color depth coding can be transmitted between two computer or video terminals connected either by ordinary telephone wires or other telephone wiring using a 33.6 kilobits per second modem or a 28.8 kilobits per second modem or a 19.6 kilobits per second modem.

2. Description of the Prior Art

In the prior art, several still and moving video image compression and decompression schemes (methods) or algorithms exist. In the case of a 640 pixels on each field line for a total of 480 field lines (640×480) resolution display screen of most computers presently in use, these compression and decompression schemes seek to compress the 921,600 bytes (based on 24-bit color depth coding) of each image frame to a manageable number of bytes or bits suitable for transmission between two computer terminals using either ordinary or other bytes of telephone wires or by satellite means; or for reduced storage disk space. In the special case of transmission between two computer terminals connected by ordinary telephone wires in whole or in part, a modem (modulator-demodulator) circuit is used. Such modems are varied, the most common and most efficient ranging in transmission capacity from around 14,400 bits per second to 28,800 bits per second to 33,600 bits per second and a little beyond.

Unfortunately, with the existing video compression schemes with both hardware/software, hardware only or software only based compression such as MPEG, Indeo, Wavelet, Fractals, etc, the compression ratios though are good ranging from as low as 3 to 1 to well over 100 to 1 over none-compressed video, it is not possible to transmit 30 frames per second (full-motion) in 24-bit color depth coding, full screen video through either a 14,000 bits per second or a 28,000 bits per second or a 33,600 bits per second modem between two computer terminals.

As an example a 100 to 1 compression ratio in 24-bit color depth of an image reduces a 921,600 bytes frame code to 9216 bytes. However, 9216 bytes (73728 bits) cannot be transmitted in one second by a 33.6 kbps modem, without even considering that at that compression ratio 30 image frames would require 2211840 bits to transmit in only one second whereas the modem can transmit only 33600 bits per second. Accordingly, there is a need to provide for a better video image compression scheme to compress a video image to the level where the compressed video image data is small enough to be transmitted between two terminals using available modem circuits.

In U.S. patent application Ser. No. 08/838,324 filed on Apr. 8, 1997 in the names of the present applicant, there is provided a method for compressing a video image using the method of image frame partition to encode the partitioned group of pixels with each such group of pixels that are equal in number being provided a unique binary code based on each colour with average or varying brightness of each pixel within the group. This method provides compression ratios of 20 to 1, 15 to 1, 10 to 1 and 5 to 1 for 32-bit, 24-bit, and 8-bit color depth coding respectively and also 3 to 1 and 1.5 to 1 adjustable compression ratios for 24-bit color depth coding when each pixel is represented by one byte and by two bytes respectively.

All these compression schemes further demonstrate the enormous need to compress video data both for transmission and for storage.

SUMMARY OF THE PRESENT INVENTION

It is the main object of this invention therefore to provide a method for compressing both still and moving video images so that the data needed to describe an image frame is reduced to such an amount or level so as to be transmitted between the computer or video terminals using presently available modem circuits, such as the 33.6 kilobits per second modem circuit, the 19.6 kilobits per second modem, or the 28.8 kilobits per second modem, depending on the image resolution used, how characters are coded on the specific image process being used and the color depth of the image.

Another object of the present invention is to provide a method for compressing either still or moving video images to such amount or level of data code so that the amount of computer storage space needed to store either moving or still video is reduced by the same ratio as the compression ratio afforded by the method of this invention.

another object of the present invention is to provide a method for compressing either still or moving video images to such amount or level of data code so that the amount of time spent transmitting such video between two computer or video terminals is reduced by the ratio afforded by the compression method, thereby saving costs in on-line time expenses for example.

Another object of the present invention is to provide a method for decompressing either still or moving video so that the receiving computer or video terminal can reconstruct the original transmitted image or images from the compressed data received by the receiver terminal from the source terminal.

Other objects and advantages of the present invention will become more apparent to those well versed in this art by studying the following detailed description of the specifications of this invention and the accompanying drawings.

DETAILED DESCRIPTION OF THE PREFERRED EMBODIMENT

Figure 1:
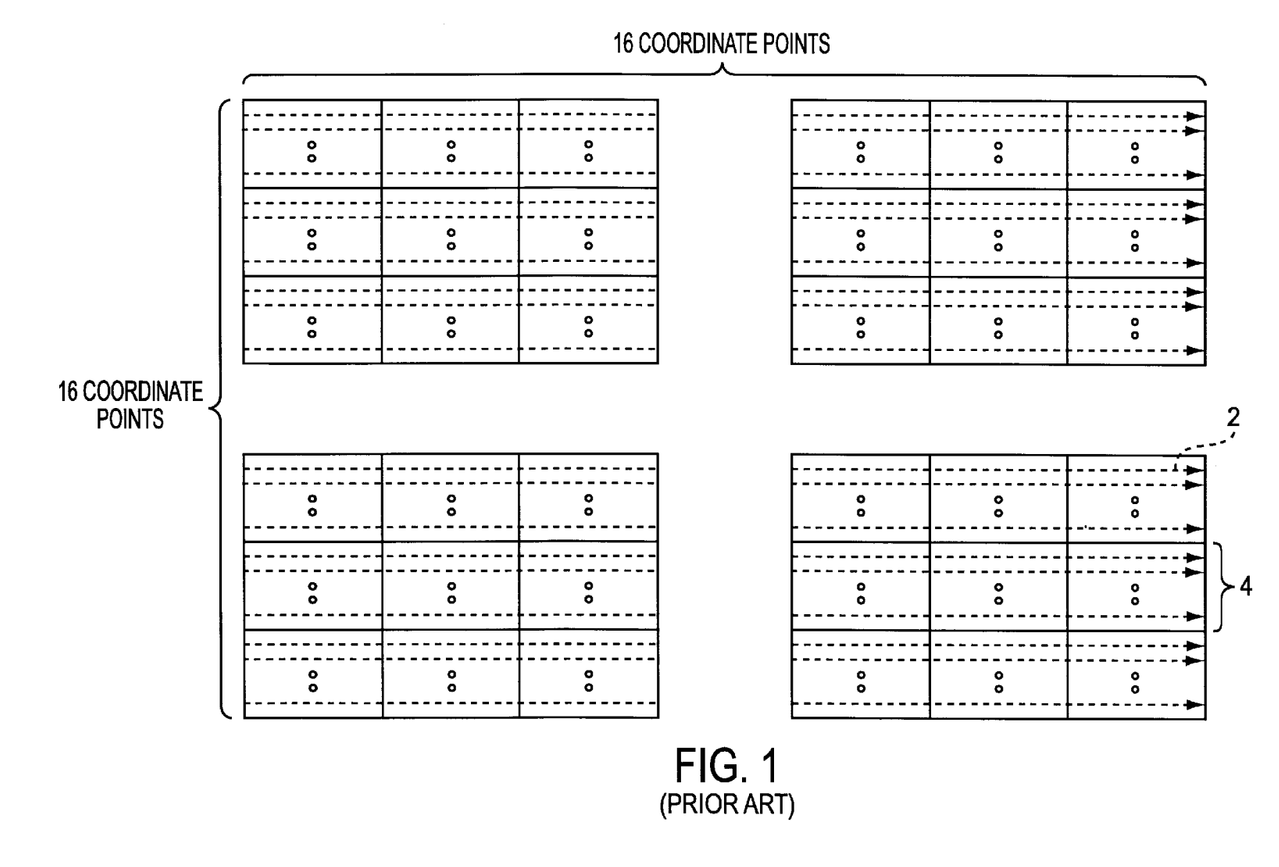
FIG. 1 is the drawing showing prior art in U.S. patent application Ser. No. 08/838,324 of Apr. 8, 1997 of how a 640×480 display screen may be partitioned in order to encode an image frame.
Figure 2:
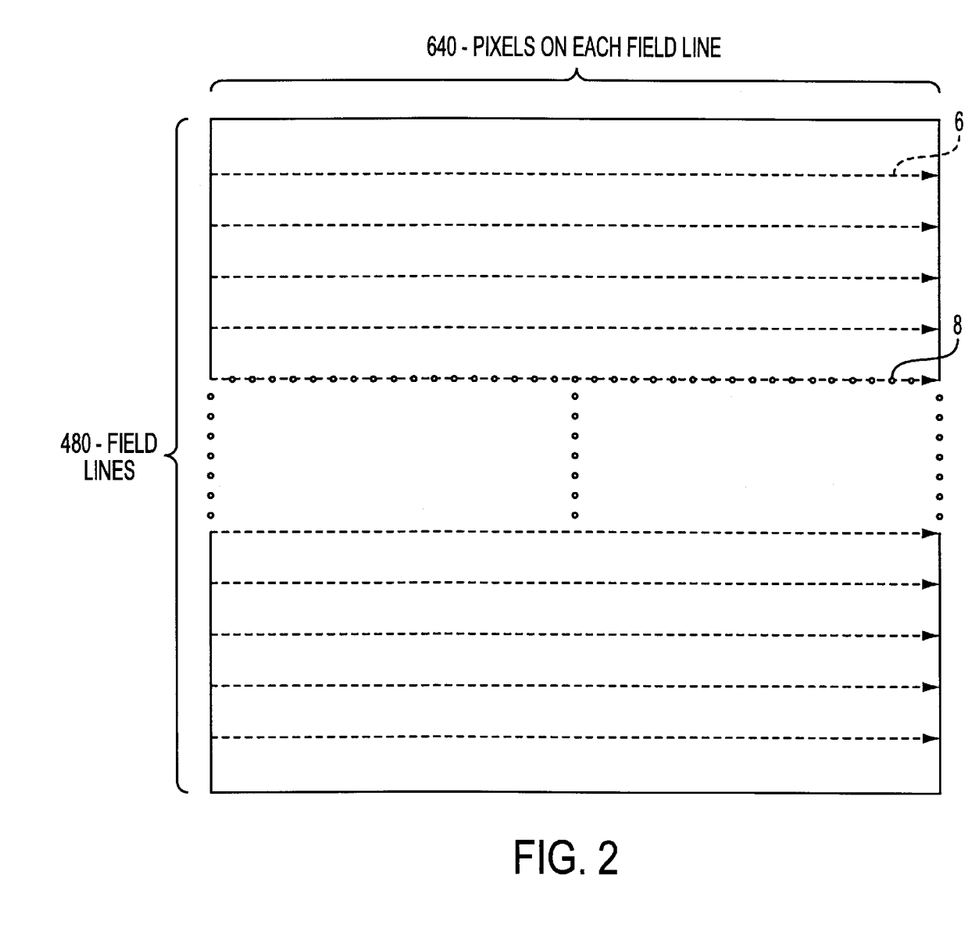
FIG. 2 is the drawing showing the specific example of how a 640×480 display monitor screen is arranged both in practice and according to this example.

Referring now to FIG. 2, a computer display monitor or screen with a 640×480 (480 field lines with each field line having 640 pixels) resolution is provided, with 6 showing the field line and 8 showing an individual pixel point or position. The 640×480 display screen image resolution is provided and used in this invention as a specific example because they are widely available on most computers in the world today.

Figure 4:
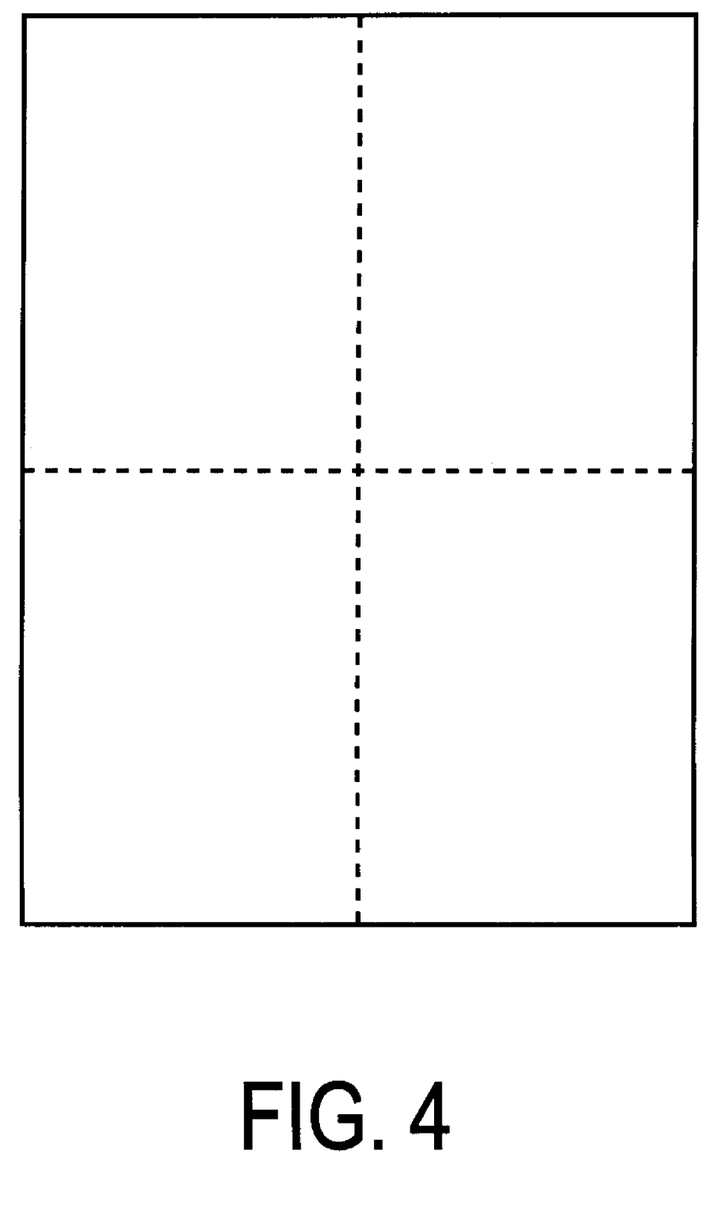
FIG. 4 is the drawing showing comparatively the arrangement of data in a 2×2 display screen.
Figure 5:
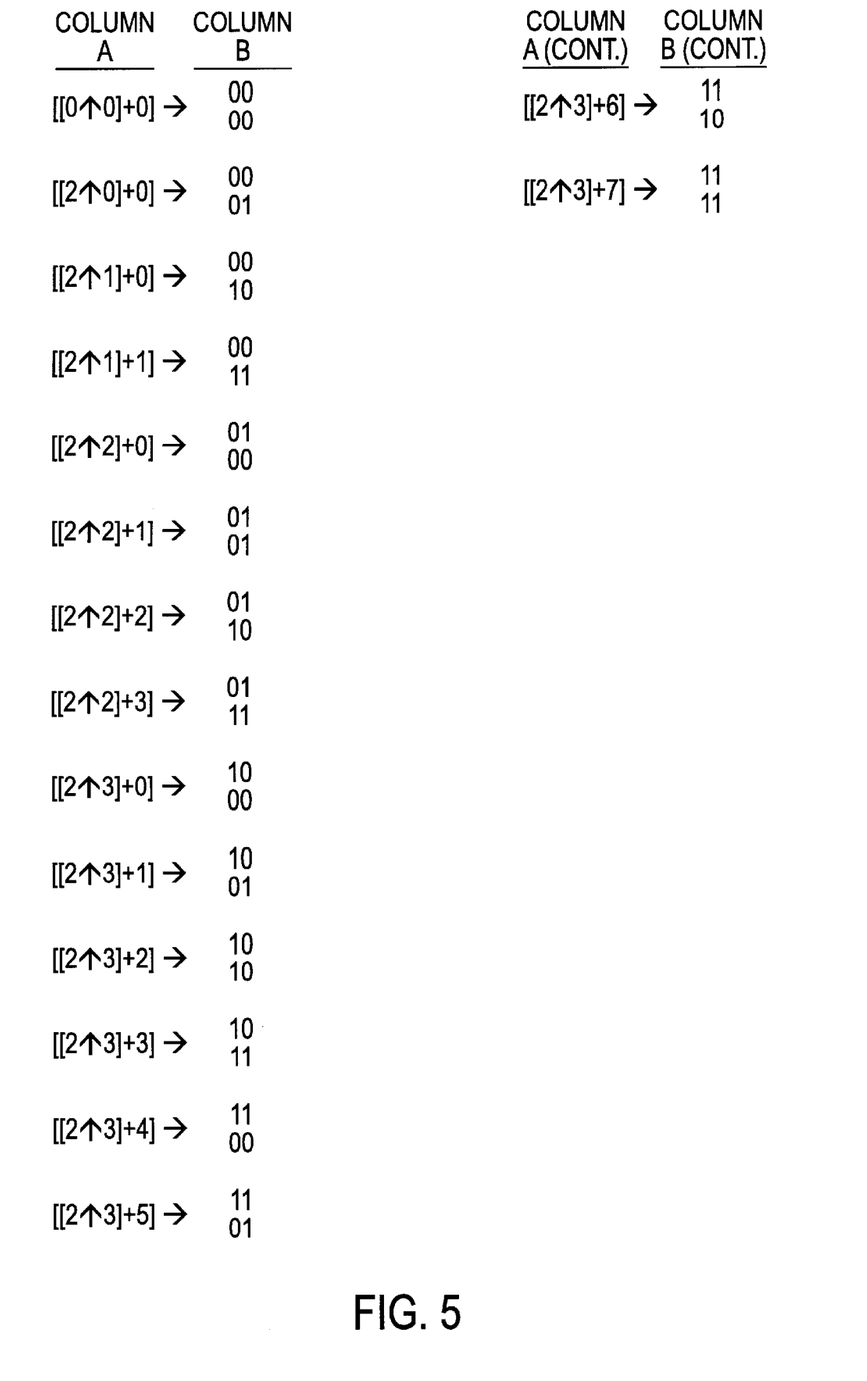
FIG. 5 shows how compression code for the 2×2 display monitor screen is generated.
Figure 6:
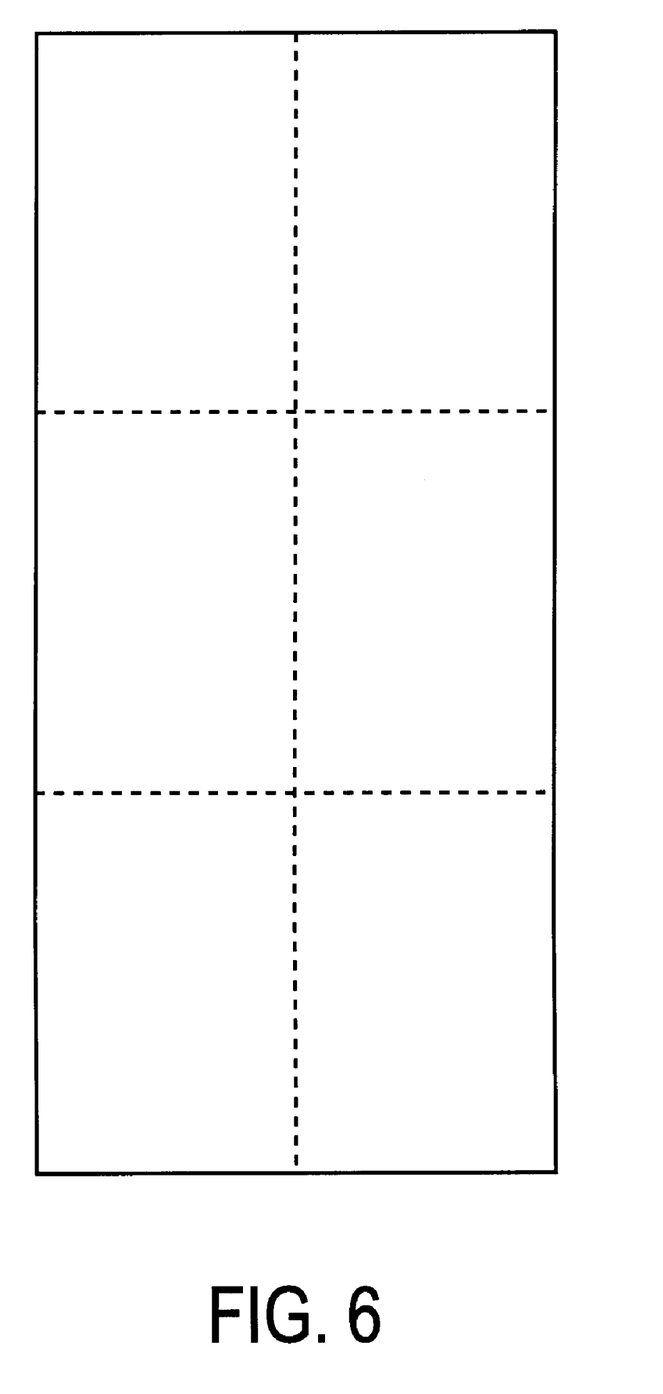
FIG. 6 is the drawing showing comparatively the arrangement of data in a 2×3 display screen.
Figure 7A:
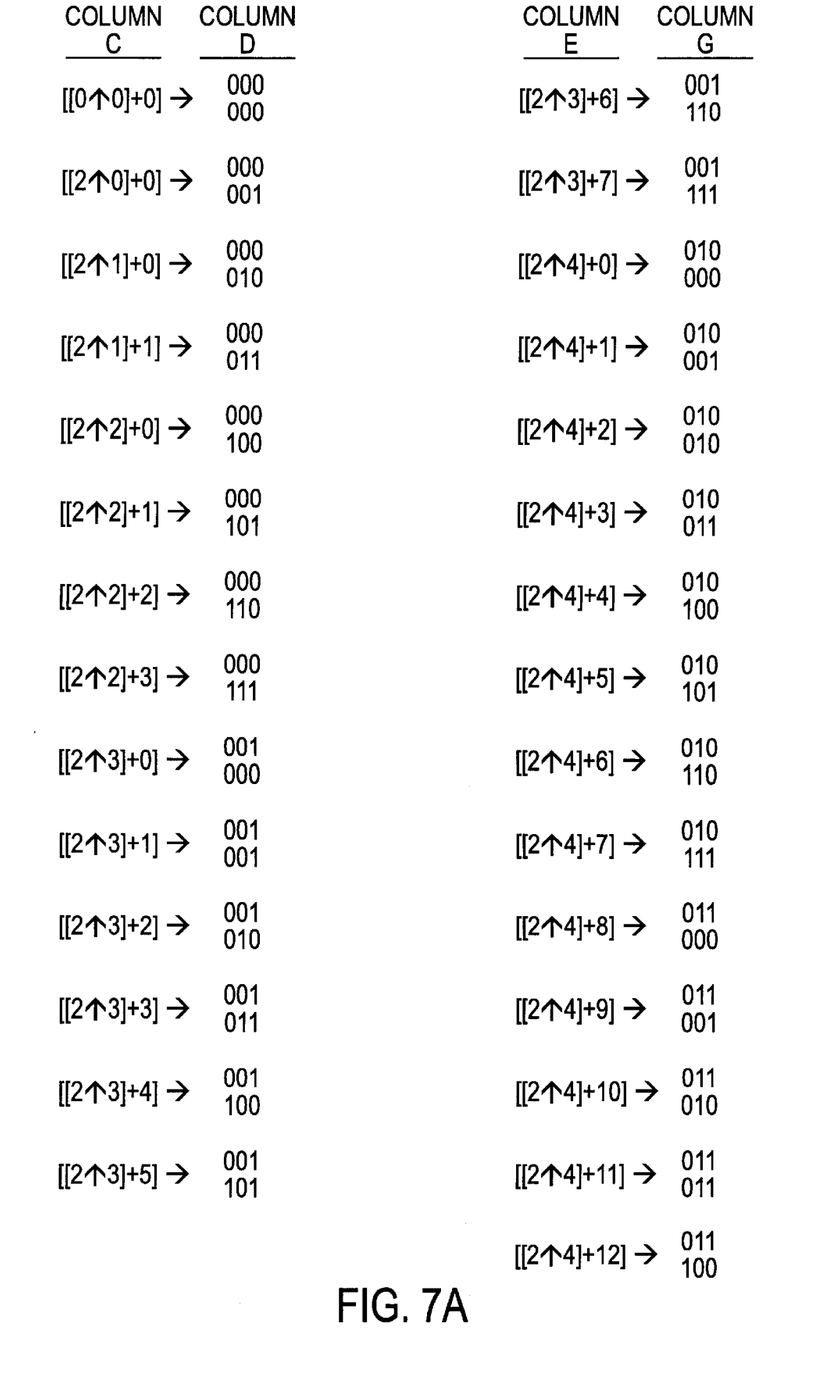
FIG. 7 shows how compression code for a 2×3 display monitor screen is generated.
Figure 7B:
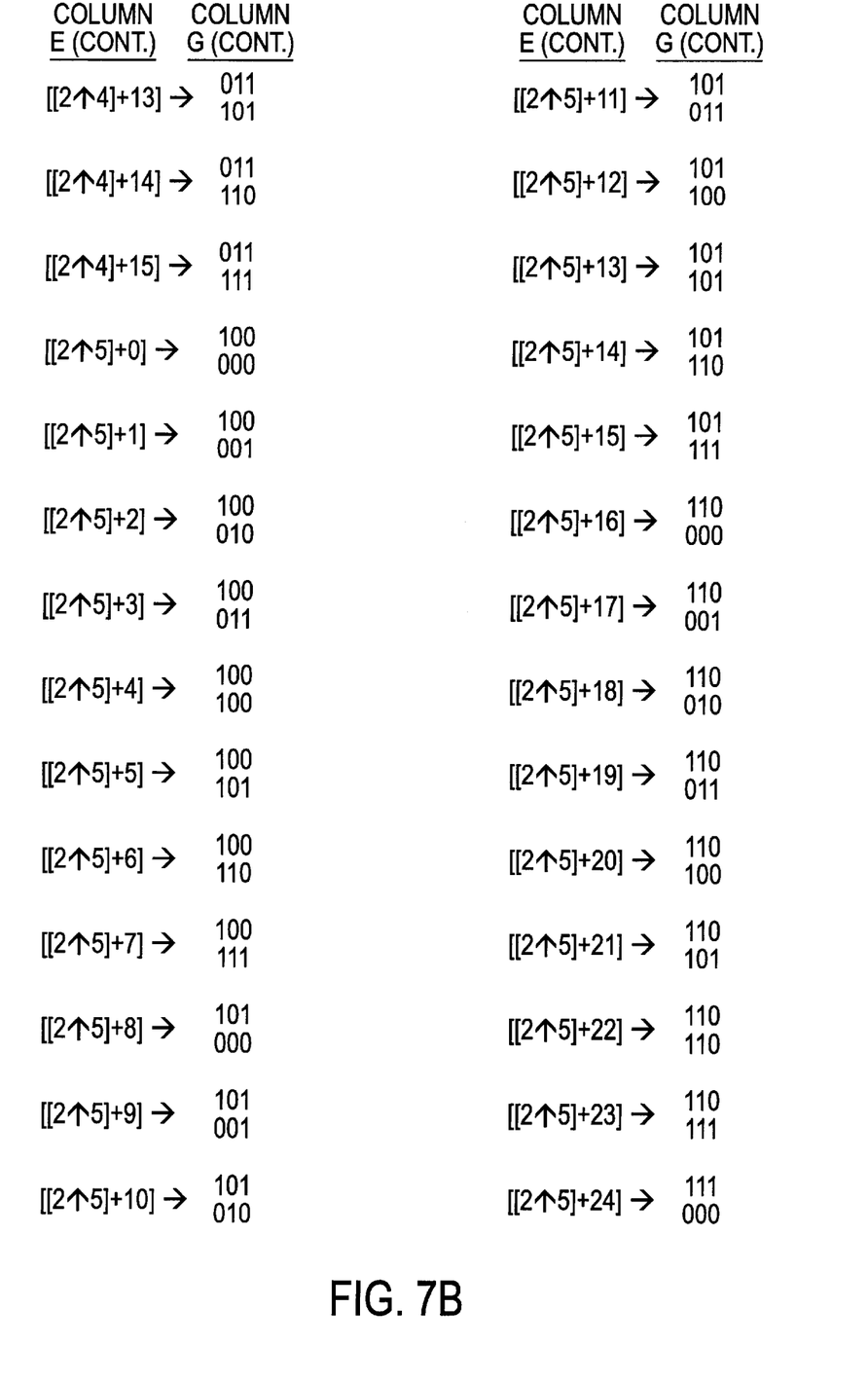
Figure 7C:
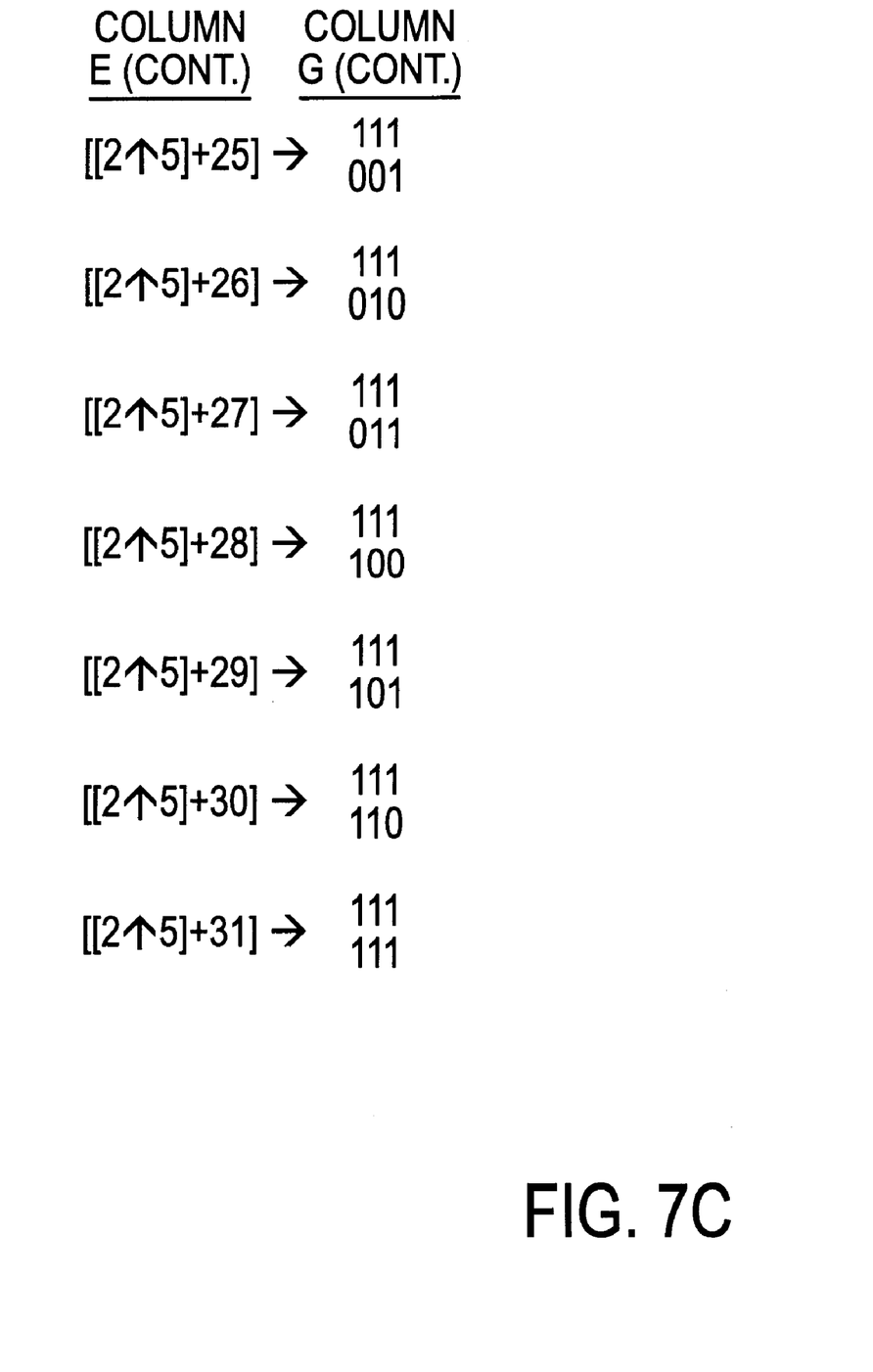

In order to understand exactly how image frame data is compressed, then transmitted either by wire or otherwise, according to this invention, attention is now drawn to FIG. 4 and FIG. 5 and to FIG. 6 and FIG. 7 respectively.

In FIG. 4 is a 2×2 screen, meaning that it has 2 rows of pixels with each row having 2 pixels for a total of 4 pixels. If each pixel for example is represented by one (1) bit, either a one or a zero, then in FIG. 6, in the left hand column or column A, all the unique possible combinations of how the 4 bits can be arranged in the four display screen map positions are provided. In the right hand column, or column B of FIG. 6 are the mathematical expressions representing each of the 16 unique ways of how the four bits can be arranged in the 4 display screen image frame map or plan.

Likewise, in FIG. 5, a display screen with a 2×3 resolution is provided. This means that there are 2 rows of field lies with each field line having 3 pixels. If each pixel depending on its color is represented by either a one bit or a zero bit, then in FIG. 7 is provided all the possible unique combinations (64 combinations) of how the 6 bits can be arranged in the 6 positions of the image frame map or plan. This is done in column C and column E. Then in Column D and Column G are the mathematical expressions, 64 in total number with each mathematical expression representing its own unique bit arrangement.

For such few image frame pixels and the corresponding image frame map being small in area, as shown in FIG. 4, FIG. 5, FIG. 6 and FIG. 7, there is little advantage between storing or transmitting the entire bit mapped image and storing or transmitting the equivalent mathematical expression. However, these two examples and the accompanying 4 figures are provided herein as indicative examples of how to generate mathematical expressions that define the bit maps of image frames in a one to one relationship that is unique and hence identifiable to the computer or processor without making any errors.

Figure 3:
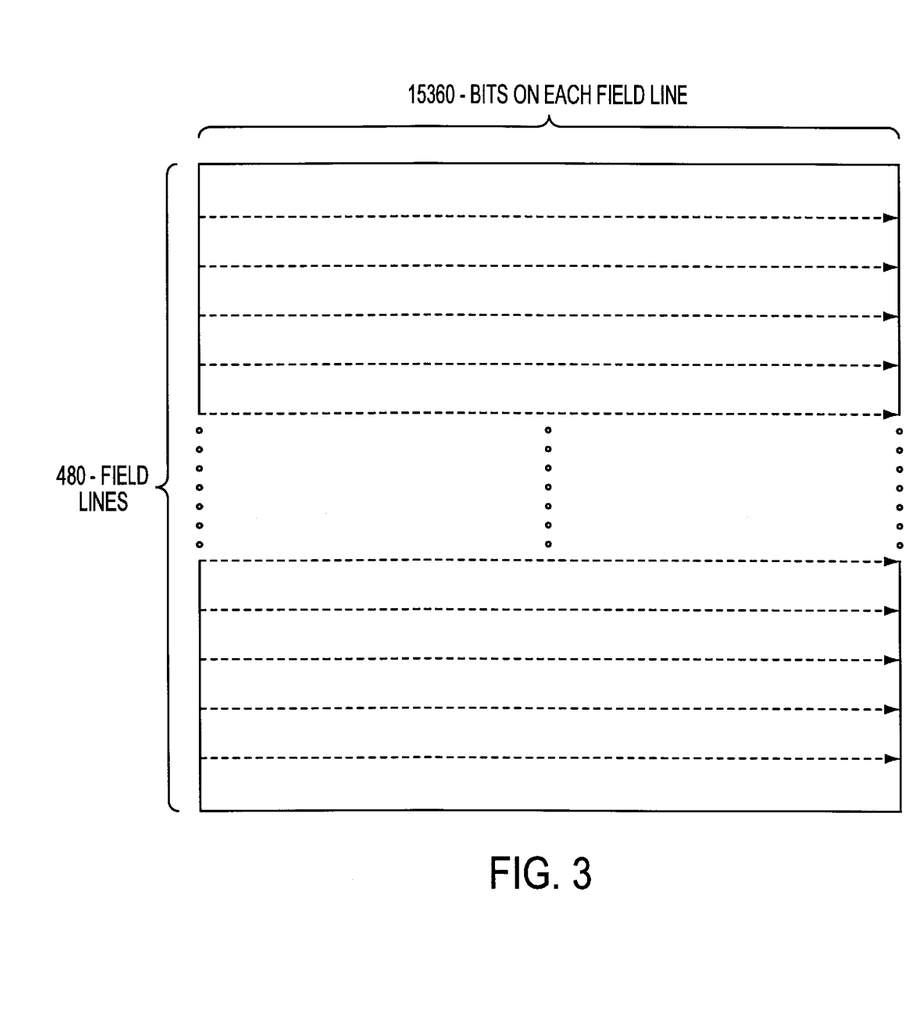
FIG. 3 is the drawing showing how an image frame data code in 24-bit color depth coding is arranged on a 640×480 display monitor screen bit map.
Figure 8:
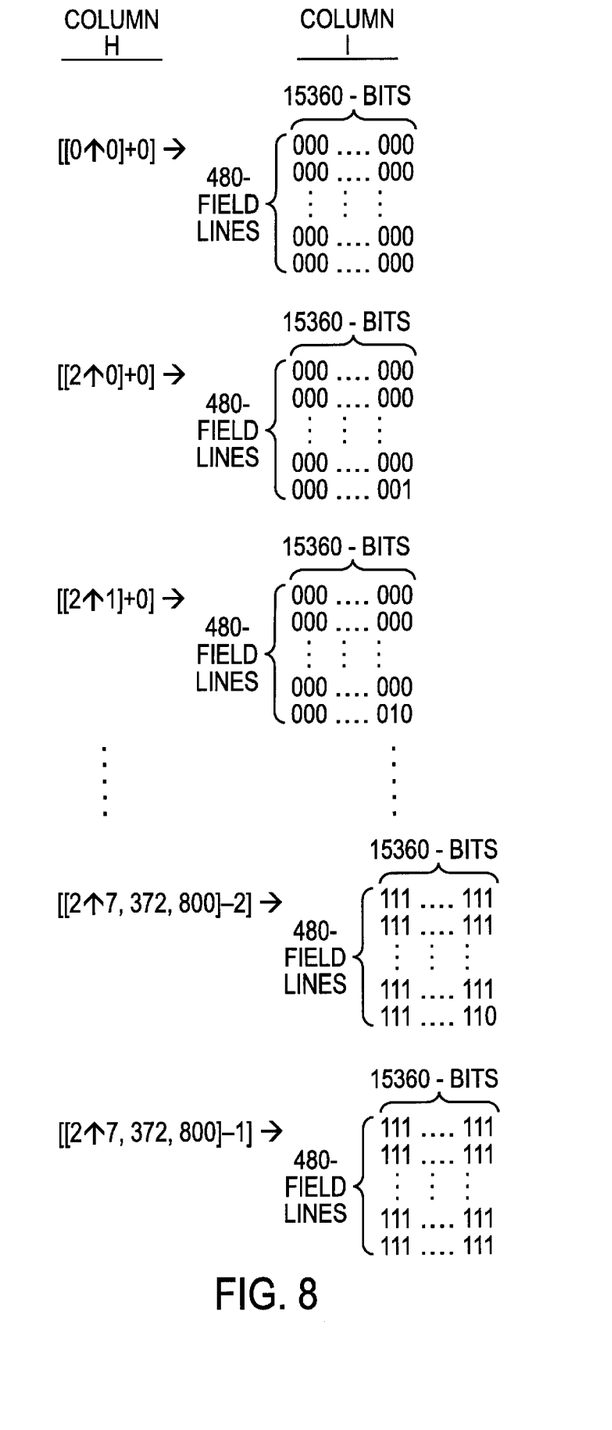
FIG. 8 shows how compression code for a 640×480 display screen is generated using 24-bit color depth coding.

Turning now to FIG. 3, an image displayed on a 640×480 display screen in 24-bit color depth coding has a total of (640×480×24)=7,372,800 total bits or 921,600 bytes. When all the bits representing the entire image frame are bit mapped, this comes to 15360 bits per field line for all the 480 field lines, down the display bit map or screen. Now following the indicative examples provided in FIG. 4, FIG. 5, FIG. 6 and FIG. 7, this means that a total of 2 raised to the power of 7,372,800 (2⁷,³⁷²,⁸⁰⁰) unique combinations of how the 7,372,800 bits can be arranged in a 480×15360 image display map or plan are possible. These can be arranged as shown in FIG. 8, in column 1. Their equivalent mathematical expressions that have a one to one relationship that is unique to each pair are in column H. For example, the first bit arrangement where all the 480 field lines are arranged with zeros is given as:

[[0↑0]+0].

The second bit arrangement where all the 479 field lines are arranged with zeros except the 480$^{th}$ field line that has a 1 (one) in its right-most bit position (least significant bit position) is given the expression

[[2↑0]+0].

The third bit arrangement, where all the 479 field lines are arranged with zeros except the 480$^{th}$ field line that has a one (1) in its next to the last, or next to the right most or next to the least-significant bit position or the second bit from the left is represented by the mathematical expression

[[2↑1]+0].

This mathematical expression allocation to each unique bit map arrangement continues until the last unique bit map arrangement with the unique mathematical expression

[]2 7,372,800]-1].

It should be pointed out here that the up pointing arrow in each mathematical expression (↑) means or represents exponentiation. Exponentiation is commonly defined as the act of raising a number to a power. For example the number zero has been raised to the power of zero, two has been raised to the power of zero, two again has been raised to the power of one and finally 2 has been raised to the power of [[2↑7,372,800)]-1]] respectively when generating mathematical expression representing different bits maps for a 640×480 display monitor in 24-bit coding.

In other words, the 7,373,800 bits are treated as a single binary code word and arranged in the 480×15360 matrix starting with the first (left-most) bit or most significant bit on the first row or the field line and ending with the last (right most) bit or the least significant bit on the 480$^{th}$ row or field line.

Once again, each mathematical expression such as [[2↑2]+3] is unique in itself and represents a unique bit arrangement in the 480 by 15360 bit map. For example the bit map for the [[2↑2]+3] mathematical expression represents all the 497 rows or field lines with zero bits except the 480$^{th}$ row or field line that has the last 3 bits in its least significant positions filled with ones while the rest of the row or the field line is fielded with zeros.

This image frame encoding is not limited only to a 640×480 display screen resolution. It can be applied to any type of display screen resolution with either 24-bit color depth coding, or any other color depth coding such as 8-bit color depth coding, 16-bit color depth coding, 32-bit color depth coding or 64-bit color depth coding. Screen resolutions such as 1024×768, or 1600×1200, or 1280×1024 in any color depth coding can be used. However, for each display screen resolution and each color depth coding chosen, different mathematical expressions are paired in a one to one unique relationship to different image frame bit mapping. For example, a 320×240 display screen resolution in 16-bit color depth coding provides a (320×240×16) bit word or (320×240×16) bit word or 76800-bit word, so that there are a total of base two raised to the power of 76800 unique bit mappings. Accordingly a total of base two raised to the power of 76800 unique mathematical expressions to represent each unique bit mapping are generated.

Having generated the unique mathematical expressions, one needs to know how many bits each unique expression will contain for purposes of image frame storage and transmission. This depends on both the computer being used and how each element or character is coded according to that computer. For example, if the processor in the computer uses 64-bit coding for each element or character in the mathematical expression then for a 640×480 resolution display image in 24-bit color depth coding would be about (64×9) or 576-bits since there are a maximum of 9 characters, namely:

4 brackets, base two, the power to which base two is raised, the plus or minus sign and the default number that is either added to or subtracted from the exponentiated function. Certainly this means that most characters or elements in the mathematical expression such as the base two character, the bracket character etc, have their most significant bit positions extended to the 64-bit length by writing zeros in them.

It really depends on the op-codes of the microprocessor of the computer being used and the format of coding the mathematical expression elements or characters.

As an example, using a 64-bit op-code character coding of the mathematical expression, and comparing it to a non-compressed 640×480 resolution display image frame in 24-bit color depth coding would provide a compression ratio of 921,600×8 to 576

OR 12800 to 1.

For modem transmission in full-screen, full motion (30 frames per second) using a microprocessor character coding format of 64-bits per character for the 9 characters in each mathematical expression, would result in (574×30) or 17280 total bits for the 30 frames in each second enough to pass through a 28800 bits per second modem in one second, or a 19600 bps modem in one second.

To retrace the steps of image capture, frame by frame, for purposes of clarification with regard to the image compression algorithm of this invention, the following steps are taken both by the operation of the video computer processor or any video terminal such as a television set equipped to deal with image coding and decoding. First, an image is captured using a camera or a scanner or from disk or some other suitable source and input into the computer memory in a frame format. If the image frame capture medium is the type that compress the image frame as it captures it, provision must be made in the video computer to decompress the image or to provide a mechanism whereby the computer can read or convert the compressed data into non-compressed data. Second the capture resolution and the color depth coding have to be known or provided.

As a second step, the image frame, now in working memory such as frame memory has its binary code read or arranged as it will appear in the bit map of the resolution and color depth chosen. That is each of the rows or field lines, say 480 in number, in case of a 640×480 resolution display are filled with the image frame binary code starting with most significant bit being placed in the most significant bit position of the first row or field line in sequential descending order and ending with the least significant bit of the image frame word being filled or placed in the least significant bit position of the $480^{th}$ line of the image frame bit map. As explained earlier on in this description, in the unique case of 24-bit color depth coding on a 640×480 display monitor this word has 7,372,800 binary bits. Each of the 480 rows of field lines therefore has 15360 bits for a total of said 7,372,800 binary bit-word for the entire bit map of the image frame.

For each image frame, therefore, the 7,372,800 bit word in the bit map is read by the microprocessor as a single binary word and its mathematical expression derived as shown in the examples of FIG. 4, FIG. 5, FIG. 6, FIG. 7 and FIG. 8.

Having derived the mathematical expression that represents the arrangement of the binary bits in the bit map as described in the above paragraphs, this mathematical expression now represents the bit mapped image in exact manner and has a one to one unique relationship with the bit mapped image. If such an image as is being compressed is to be stored, the mathematical expression is sent to storage. If the image is to be transmitted to another video terminal, the mathematical expression is transmitted, and not the bit mapped image.

If the receiving video computer terminal is equipped with similar software, that provides such particular such as image display resolution, color depth bit coding, the received mathematical expression is evaluated or processed, the resulting bits are bit-mapped according to the procedure described in the above paragraphs, to provide back the 7,372,800 bit word arranged in a 15360×480 in 24-bit color coding on a 640×480 display screen, and the image is then printed or displayed on the screen of the receiving video computer terminal.

If the image received is not for immediate display either in soft or hard copy format, then there is no need to immediately evaluate the mathematical expression received, one for each image frame since sotrage space is at a premium and storage space will be saved by leaving the mathematical expression unprocessed.

To explain in more detail about how the image frame bit map code or work is arranged, regarding the 24-bit color depth coding on a 640×480 display resolution, the first most significant 15360 bits of the 7,372,800 bit word or code are written on field line one. The next 15360 significant bits are written on field line two, always starting from the left of the field line, the next 15360 significant bits are written on field line three in the order of their significance starting from the left to the right until the last 15360 bits are written on field line 480.

The invention is now fully described with specific reference to the embodiments mentioned in the description. Other embodiments however are possible. For example, a television set can be hooked (connected) to ordinary phone lines using a modem and a decoder, to receive still or moving video that has been compressed according to the method of this invention. The decoder that may be software only, hardware only or a combination of both, contains the software to decompress (evaluate) the mathematical expressions and given display resolution and color depth coding figures to bit map every incoming image frame (mathematical expression) and display it on the screen in real time.

The invention described here need not be used to transmit images via telephone wires only. For example, it can be used to increase video carrying capacity of cable television lines or the video carrying capacity of satellite channels. Since video compressed and then decompressed according to the method of this invention can be in true color (24-bit color depth coding) and better; but also less, this method in this invention has far more applications therefore than existing video compression schemes.

The method of the invention described here in provides a good solution to the problem of transmitting 24-bit color depth coded video and better over ordinary telephone lines in full-frame (30 frames per second) using presently available modems such as the 19.6 kbps, the 28.8 kbps and the 33.6 kbps modems. Full frame, full motion video transmission over ordinary telephone lines is becoming increasingly important because of the increasing importance and usage of the Internet where most computers are connected to each other in a network using ordinary telephone lines, mostly.

The invention described here in provides an added advantage over other existing video compression, decompression and transmission schemes because it does not degrade image quality by removing redundant image information as a method of image compression. It compresses all the image information as it is and therefore the original image is a copy-cat copy of the decompressed image.

The method of the invention described here in provides further advantage over existing video compression schemes because the method of image compression, decompression and transmission is simple, and can be done in real-time by any over-the-counter microprocessor based video terminal, thereby saving transmission times of video images, saving money as a result; or saving storage space and therefore expenditure in cases where these images are for storage.

Accordingly, the scope of this invention should not only be limited to the preferred embodiments described herein, since as mentioned above other modifications and changes are possible and should be construed as included herein.

What is claimed is:

1. A method of compressing one or more video image frames in a video processor comprising the steps of:

(a) determining the image frame display resolution of said video processor;

(b) determining the bit color depth coding of said method of compressing one or more video image frames of said video processor;

(c) obtaining an image frame to be compressed according to the method of compression, and temporarily storing said image frame in a frame memory of said video compressor, said image having been coded or convertible to both the image frame display resolution of said video processor and the bit color depth coding of the method of compression previously predetermined respectively;

(d) arranging the binary code or word of said image frame in the bit map of said video processor with the first bit or most significant bit of said binary code or word of said image frame being placed in the most significant bit position of the first field line or row of said bit map and the last bit or least significant bit of said binary code or word of said image frame being placed in the last bit position or least significant bit position of the last row or field line of said bit map of said video processor;

(e) counting the total number of bits of said image frame binary code or word so as to obtain a first value in decimal notation;

(f) subtracting the number one from said first value so as to obtain a second value in decimal notation;

(g) converting said image frame binary code or word from binary to decimal notation using straight binary to decimal conversion methods so as to obtain a third value in decimal notation;

(h) raising base two to the power of said second value so as to obtain a fourth value in decimal notation;

(i) subtracting said fourth value from said third value so as to obtain a fifth value in decimal notation;

(j) writing out a mathematical expression by adding said fourth value to said fifth value, said mathematical expression being a representative equivalent in a unique, one-to-one relationship to said image frame binary code or word;

(k) using the mathematical expression that represents the binary bit arrangement of said image frame in said bit map of said image frame in said bit map of said video processor to represent said image frame data code;

(l) either storing said mathematical expression that represents the binary bit arrangement of said image frame into a suitable storage area of said video processor or transmitting said mathematical expression to another video terminal for display or storage.

2. A method of decompressing the mathematical expression of an image frame of claim 1 in a video processor comprising the steps of:

(a) determining both the image frame display resolution and the bit color coding for which said mathematical expression was derived;

(b) providing said mathematical expression to a working memory of said video processor;

(c) evaluating said mathematical expression provided to said working memory of said display processor, and obtaining a first result, said first result being noted in base ten;

(d) converting said first result in base ten obtained by evaluating said mathematical expression from base ten to a second result, second result being noted in base two;

(e) determining where said second result in base two has exactly the same binary bit count number as the maximum binary bit number obtained by multiplying said image frame display resolution by said bit color depth coding number, whereby said image frame display resolution is obtained by multiplying the total number of field lines of the video screen of said video processor by the total number of pixels on each field line;

(f) filling in zeros in those bit positions of the most significant bit areas where said second result in base two is short of the binary bit count of the maximum binary bit number obtained by multiplying said image frame display resolution by said bit colour depth coding number, so as to obtain a third result in base two whose actual binary bit count is exactly the same as the binary unit count of the maximum binary bit number obtained by multiplying said image frame display resolution by said bit colour depth coding number;

(g) arranging said third result into a bit map of the predetermined image frame display resolution and bit colour depth coding in such a way that the most significant bit or the first bit of said third result is placed in the first bit position or the most significant bit position of the first row or field line of said bit map and the last bit or least significant bit is placed in the last bit position or least significant bit position of the last row or field line of said bit map, whereby each row or field line contains an equal number of bits arranged in descending order from most significant bit to least significant bit of said third result, whereby each field line contains a total number of binary bits equal to the number of pixels on each field line of said image frame display resolution multiplied by the bit color depth coding number;

(h) instructing either a microprocessor on a display processor of said video processor to either store said mathematical expression in said video processor memory or display the bit mapped image respectively.

3. The method of claim 1 wherein the total number of binary bits to be placed in sequential significant bit descending order of said image frame binary code or word, from most significant bit to least significant bit, on each field line is calculated by multiplying the total number of pixels on each field line of said image frame display resolution by the bit color depth coding number.

4. The method of claim 1 wherein the total number of rows or field lines in each bit map is equal to the total number of rows or field lines of said image frame display resolution.

5. The method of claim 1 wherein more than one bit color depth coding number can be used to encode said image frame, whereby for each bit color depth coding number employed a corresponding bit map is required.

6. The method of claim 1 wherein several image frame display resolutions are provided up to a maximum image frame display resolution that is equal to the image frame display resolution of the image frame display resolution of the display screen of said video processor, whereby for each of said several image frame display resolutions a different bit map is needed.

7. The method of claim 1 wherein the maximum number of bits allocated to represent the mathematical expression depends on the microprocessor of said video processor, whereby for a given microprocess or each the nine characters or elements of said mathematical expression is allocated a specific number of bits.

8. The method of claim 1 wherein the compression ratio of said method of compressing one or more images is obtained by dividing the total bits of an uncompressed image frame by the total number of bits of the mathematical expression.

* * * * *